(12) United States Patent
Howarter et al.

(10) Patent No.: US 8,650,590 B2
(45) Date of Patent: *Feb. 11, 2014

(54) SYSTEM AND METHOD FOR BYPASSING AN EMERGENCY ALERT BREAK-IN FOR A RECORDED EVENT

(75) Inventors: Jamie Howarter, Overland Park, KS (US); Douglas Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,041

(22) Filed: Dec. 13, 2011

(65) Prior Publication Data

US 2012/0084808 A1 Apr. 5, 2012

Related U.S. Application Data

(63) Continuation of application No. 12/370,930, filed on Feb. 13, 2009, now Pat. No. 8,099,750.

(51) Int. Cl.
*H04N 7/10* (2006.01)
*H04N 7/025* (2006.01)

(52) U.S. Cl.
USPC ............... 725/33; 725/93; 725/94; 725/116; 725/146

(58) Field of Classification Search
USPC ................................ 725/33, 93–94, 116, 146
See application file for complete search history.

(56) References Cited

U.S. PATENT DOCUMENTS

| 5,572,201 A | 11/1996 | Graham et al. |
| 5,774,172 A | 6/1998 | Kapell et al. |
| 5,850,218 A | 12/1998 | LaJoie et al. |
| 5,995,553 A | 11/1999 | Crandall et al. |
| 6,100,916 A | 8/2000 | August et al. |
| 6,853,355 B1 | 2/2005 | Kang et al. |
| 7,003,052 B2 | 2/2006 | Koike |
| 7,444,657 B2 | 10/2008 | Kendall et al. |
| 8,099,750 B2 | 1/2012 | Howarter et al. |
| 8,336,067 B2 | 12/2012 | Howarter et al. |
| 2002/0124252 A1 | 9/2002 | Schaefer et al. |
| 2003/0069002 A1 | 4/2003 | Hunter et al. |
| 2003/0216133 A1 | 11/2003 | Poltorak |

(Continued)

OTHER PUBLICATIONS

U.S. Appl. No. 12/370,912; Notice of Allowance dated Sep. 24, 2012; 19 pages.

(Continued)

*Primary Examiner* — Jason Salce
(74) *Attorney, Agent, or Firm* — Swanson & Bratschun, L.L.C.

(57) ABSTRACT

Embodiments of the disclosed invention include a system and a method for bypassing an emergency alert break-in for a recorded event. For example, in one embodiment, a set top box is disclosed that includes a memory component for storing computer executable instructions; a communication interface for receiving media content data from a cable service provider; a decoder module for decoding the received media content data; an emergency alert break-in monitoring module for identifying an emergency alert break-in from the received data; a digital video recorder controller module for determining whether the identified emergency alert break-in affects a recording of a program on a recorded channel; and an emergency alert break-in bypass module for bypassing the identified emergency alert break-in for enabling the digital video recorder controller module to record the program without the identified emergency alert break-in.

17 Claims, 4 Drawing Sheets

(56) References Cited

U.S. PATENT DOCUMENTS

| | | |
|---|---|---|
| 2004/0049785 A1 | 3/2004 | Grzeczkowski et al. |
| 2004/0123316 A1 | 6/2004 | Kendall et al. |
| 2005/0086685 A1* | 4/2005 | Rahman et al. .................. 725/33 |
| 2005/0118984 A1 | 6/2005 | Akiyama et al. |
| 2006/0015898 A1 | 1/2006 | Kim et al. |
| 2006/0271952 A1 | 11/2006 | Gurley et al. |
| 2007/0037549 A1 | 2/2007 | Poltorak |
| 2007/0115391 A1 | 5/2007 | Anderson |
| 2007/0118861 A1 | 5/2007 | Stone |
| 2007/0136743 A1 | 6/2007 | Hasek et al. |
| 2007/0143816 A1 | 6/2007 | Gupta et al. |
| 2007/0186269 A1 | 8/2007 | Malik |
| 2007/0204291 A1 | 8/2007 | Ichihashi |
| 2007/0298758 A1 | 12/2007 | Verma et al. |
| 2008/0069998 A1 | 3/2008 | McClenny et al. |
| 2008/0109839 A1 | 5/2008 | Bruce et al. |
| 2008/0115171 A1 | 5/2008 | Barsness et al. |
| 2008/0120639 A1 | 5/2008 | Walter et al. |
| 2008/0120640 A1 | 5/2008 | Yun et al. |
| 2008/0122988 A1 | 5/2008 | Johnston |
| 2008/0216113 A1 | 9/2008 | Yun et al. |
| 2009/0025027 A1 | 1/2009 | Craner |
| 2009/0119728 A1 | 5/2009 | Broberg |
| 2009/0199232 A1 | 8/2009 | Takeyama et al. |
| 2009/0271818 A1 | 10/2009 | Schlack |
| 2009/0282434 A1 | 11/2009 | Yasuho et al. |
| 2010/0138858 A1 | 6/2010 | Velazquez et al. |
| 2010/0146541 A1 | 6/2010 | Velazquez |
| 2010/0162299 A1 | 6/2010 | Downey |
| 2010/0162300 A1 | 6/2010 | Velazquez et al. |

OTHER PUBLICATIONS

U.S. Appl. No. 12/370,912; Issue Notification dated Nov. 28, 2012; 1 page.

U.S. Appl. No. 12/370,944; Non-Final Rejection dated Sep. 28, 2012; 15 pages.

U.S. Appl. No. 12/370,912; Final Rejection dated Jul. 21, 2011; 10 pages.

U.S. Appl. No. 12/370,912; Non-Final Rejection dated Feb. 14, 2011; 15 pages.

U.S. Appl. No. 12/370,930; Non-Final Rejection dated Mar. 10, 2011; 12 pages.

U.S. Appl. No. 12/370,930; Notice of Allowance dated Sep. 1, 2011; 9 pages.

U.S. Appl. No. 12/370,930; Requirement for Restriction/Election dated Dec. 1, 2010; 8 pages.

U.S. Appl. No. 12/370,944; Final Rejection dated Aug. 9, 2011; 10 pages.

U.S. Appl. No. 12/370,944; Non-Final Rejection deed Mar. 4, 2011; 10 pages.

U.S. Appl. No. 12/370,944; Requirement for Restriction/Election dated Dec. 1, 2010; 6 pages.

U.S. Appl. No. 12/370,930; Issue Notification dated Dec. 28, 2011; 1 page.

U.S. Patent No. 8,099,750 B2; issued Patent dated Jan. 17, 2012; 11 pages.

U.S. Appl. No. 12/370,944; Final Rejection dated Mar. 7, 2013; 15 pages.

* cited by examiner

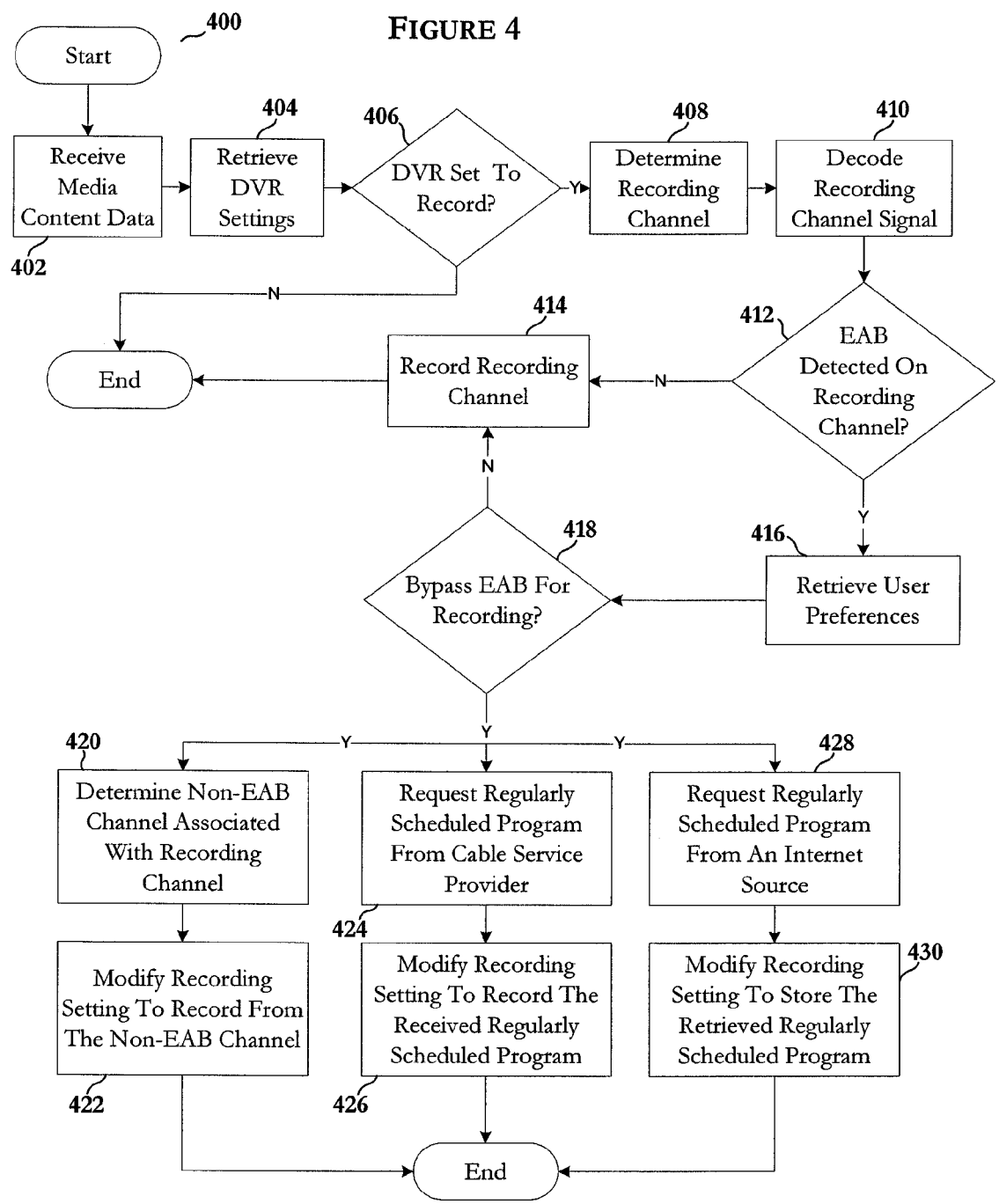

SYSTEM AND METHOD FOR BYPASSING AN EMERGENCY ALERT BREAK-IN FOR A RECORDED EVENT

CROSS REFERENCE TO RELATED APPLICATION

This application is a continuation of U.S. application Ser. No. 12/370,930 (the "930 Application"; now U.S. Pat. No. 8,099,750), filed Feb. 13, 2009 by Howarter et al. and entitled, "System and Method for Bypassing an Emergency Alert Break-In for a Recorded Event," which is hereby incorporated by reference in its entirety. The '930 Application is related to the following patent applications: U.S. application Ser. No. 12/370,944, filed Feb. 13, 2009 by Howarter et al., and entitled "System and Method for Displaying an Emergency Alert Message; and U.S. application Ser. No. 12/370,912 (now U.S. Pat. No. 8,336,067), filed Feb. 13, 2009 by Howarter et al., and entitled "System and Method for Bypassing an Emergency Alert Break-In"; each of which is assigned to the same assignee, and incorporated herein in its entirety by reference.

BACKGROUND OF THE INVENTION

The Emergency Alert System is a national public warning system that stems from the desire of the President of the United States to communicate with the public in times of national emergencies. In the early 1960s, the chief executive began allowing local and state authorities to use the system to transmit localized warnings, such as, but not limited to, child abduction emergencies (AMBER alerts) and weather information. The system has been designed to deliver messages quickly and automatically in the event of an emergency. Among its most conspicuous features to the public may be the automatic interruption of broadcast programming that replaces program audio with an aural alert and superimposes a text crawl with warning information at the bottom of the TV screen. In some situations, a local news broadcasting station may completely preempt a regularly scheduled program.

SUMMARY

Embodiments of the disclosed invention include a system and a method for bypassing an emergency alert break-in for a recorded event. For example, in one embodiment, a method is disclosed that includes receiving media content data from a cable service provider. The method determines a recording setting associated with the set top box and determines whether the media content data includes an emergency alert break-in on a channel associated with the recording setting. In one embodiment, in response to a determination that the media content data includes an emergency alert break-in on a channel associated with the recording setting, the method bypasses recording of the emergency alert break-in on the channel associated with the recording setting.

In accordance with another embodiment, a set top box is disclosed for bypassing an emergency alert break-in for a recorded event. In one embodiment, the set top box includes a memory component for storing computer executable instructions; a communication interface for receiving media content data from a cable service provider; a decoder module for decoding the received media content data; an emergency alert break-in monitoring module for identifying an emergency alert break-in from the received data; a digital video recorder controller module for determining whether the identified emergency alert break-in affects a recording of a program on a recorded channel; and an emergency alert break-in bypass module for bypassing the identified emergency alert break-in for enabling the digital video recorder controller module to record the program without the identified emergency alert break-in.

BRIEF DESCRIPTION OF THE DRAWINGS

Illustrative embodiments of the present invention are described in detail below with reference to the attached drawing figures, which are incorporated by reference herein and wherein:

FIG. 4 depicts a flowchart for bypassing an emergency alert break-in for a recorded event in accordance with the disclosed embodiments.

DETAILED DESCRIPTION

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

The disclosed embodiments recognize deficiencies associated with the current emergency alert system. For example, the disclosed embodiments recognize that, in most situations, a viewer prefers that the recording of a regularly scheduled program not be interrupted by a local news break-in and/or by an emergency alert system message. For instance, in many situations, a regularly scheduled program is recorded and not viewed until several days later. Accordingly, a recording of an emergency alert break-in occurring several days ago is of little significance to the viewer. In these situations, the viewer prefers that the regularly scheduled program had been recorded. Accordingly, the disclosed embodiments provide a system and method for bypassing an emergency alert break-in for a recorded event. As referenced herein, the term "bypass" and/or "bypassing" means to circumvent recording of an emergency alert break-in. In addition, as referenced herein, an emergency alert break-in means any message, alert, and/or newscast that interrupts by preempting (e.g., a local news break-in) and/or modifying displaying of a regularly scheduled program (e.g., adding an emergency alert system message crawling text at the bottom of the screen) to present information associated with an urgent and/or important event.

Figure 1:
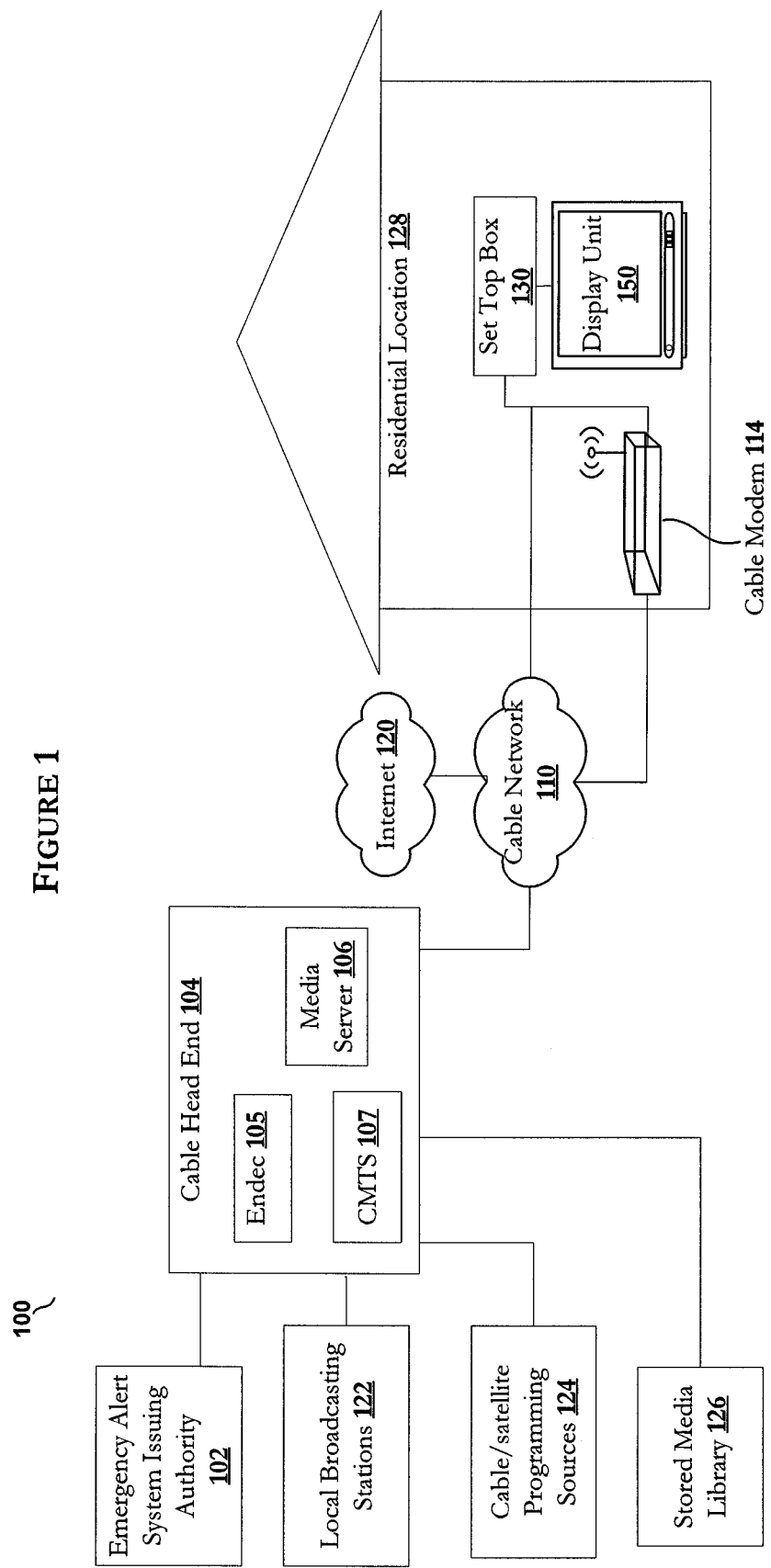
FIG. 1 depicts an embodiment of a network environment in which the illustrative embodiments may be implemented.

FIG. 1 depicts a network environment 100 in which the illustrative embodiments may be implemented for bypassing an emergency alert break-in for a recorded event. In the depicted embodiment, an emergency alert system (EAS) issuing authority 102 sends out an emergency alert system signal that includes information associated with an emergency alert system message. Emergency alert system issuing authority 102 includes national, state, and local authorities. For example, at the national level, the President may activate the emergency alert system. Additionally, the National Weather Service (NWS) and the Federal Emergency Management Agency (FEMA) may also transmit messages using the emergency alert system. At the state and local level, the EAS State Emergency Communications Committee (SECC), Local Emergency Communications Committee (LECC), and local broadcasting stations may transmit alert messages, such as, but not limited to, child abduction emergencies (AMBER alerts) and weather alerts/reports, using the emergency alert system.

One or more cable/satellite head ends, such as, but not limited to, cable head end 104, receives the emergency alert system signal from emergency alert system issuing authority 102 and/or from a neighboring broadcasting station relaying the emergency alert system message. Cable head end 104 is a facility that originates and communicates cable/satellite TV services to a plurality of subscribers, such as, but not limited to, residential location 128 via cable network 110. In addition, in one embodiment, cable head end 104 may also receive upstream requests, such as, but not limited to, receiving a video on demand request, from residential location 128 via cable network 110. In some embodiments, cable network 110 may include, but is not limited to, one or more coaxial cable networks, fiber-optic networks, and/or satellite networks. Additionally, in some embodiments, cable network 110 may also include twisted pair networks for providing IPTV cable television-type services.

In one embodiment, cable head end 104 includes an emergency alert system encoder/decoder (endec) 105 for receiving and decoding an emergency alert system signal. In one embodiment, emergency alert system encoder/decoder 105 decodes an emergency alert system signal to determine the emergency type and affected areas associated with the emergency alert system signal. For example, an emergency alert system signal contains codes that identify the key elements of an emergency alert system message, such as, but not limited to, the message originator, the event, the location of the event, and the valid time period of the message.

In some embodiments, emergency alert system encoder/decoder 105 passes the decoded emergency alert system message to a media server 106. In one embodiment, media server 106 includes computer executable instructions and/or electronic components that automatically recognize incoming EAS information and generates the appropriate emergency text crawl and/or other appropriate display information associated with the emergency alert system message for overlaying the emergency alert system message over a television program.

In some embodiments, cable head end 104 utilizing media server 106 and/or other appropriate device encodes a plurality of television programming signals from a variety of input sources, such as, but not limited to, one or more local broadcasting stations 122, cable/satellite programming sources 124, and stored media library 126. Additionally, in some embodiments, cable head end 104 receives signals broadcasted from local broadcasting stations 122 over the air using cell transmission towers. In one embodiment, cable head end 104 may encode one or more television signals, such as, but not limited to, signals received from local broadcasting stations 122, with an emergency alert system message in response to receiving an emergency alert system message originating from emergency alert system issuing authority 102.

In some embodiments, cable head end 104 may include a cable modem termination system (CMTS), such as, CMTS 107, for providing high-speed Internet access via a cable modem to subscribers. In one embodiment, CMTS 107 sends and receives digital cable modem signals on cable network 110, such as, but not limited to, receiving signals sent upstream from a subscriber's cable modem, such as, cable modem 114. In some embodiments, CMTS 107 converts the signals into IP packets and routs the signals to an Internet Service Provider for connection to Internet 120. Internet 120 is a massive network of networks that connects millions of computers/electronic devices together globally, forming a network in which any computer/electronic device can communicate with any other computer/electronic device as long as they are both connected to the Internet 120. In addition, in some embodiments, CMTS 107 may also send signals downstream to cable modem 114. In one embodiment, cable modem 114 may be hardwired to set top box 130 for communicating data between set top box 130 and cable modem 114. In some embodiments, cable modem 114 may include a wireless transceiver for communicating data wirelessly to one or more electronic device, such as, but not limited to, set top box 130.

In accordance with one embodiment of the disclosed invention, a cable/satellite programming provider may provide, as a premium service, or as a free service to their subscribers the ability to bypass an emergency alert break-in for a recorded event. For instance, as will be further described, in one embodiment cable head end 104 may encode and transmit a set of regularly scheduled programs (e.g., local channels) over a first set of channels that may include an emergency alert break-in and may also encode and transmit the set of regularly scheduled programs on a second set of channels that does not include any emergency alert break-in, hereinafter, referred to as a non-emergency alert break-in channel. In some embodiments, the non-emergency alert break-in channel may only be decoded by a digital video recorder for recording the regularly scheduled program. In other words, in some embodiments, a viewer may not elect to bypass viewing of an emergency alert break-in on a live broadcasting channel. In one embodiment, in response to identifying an emergency alert break-in on a channel associated with a recording setting of set top box 130, set top box 130 determines whether the channel associated with the recording setting has a corresponding non-emergency alert break-in channel. In these embodiments, set top box 130 may modify the recording setting to record a regularly scheduled program from the non-emergency alert break-in channel.

In accordance with another embodiment, set top box 130 may only transmit the first set of channels that may include an emergency alert break-in. In these embodiments, in response to identifying an emergency alert break-in on a channel associated with a recording setting of set top, box 130, set top box 130 may request the regularly scheduled program associated with the recorded channel from a cable service provider (e.g., using similar technology to video on demand). In response to receiving the regularly scheduled program, set top box 130 may modify the recording setting to record the received regularly scheduled program.

In addition, in some embodiments, set top box 130 may request the regularly scheduled program from an Internet television source, such as, but not limited to, a website providing live and/or recorded television programming. For example, in some embodiments, set top box 130 may attempt to retrieve the regularly scheduled program from a website associated with a network broadcasting the regularly scheduled program, such as, but not limited to, ABC.com™. For instance, ABC.com™ currently provides aired episodes of some of their regularly scheduled programs. Thus; in some embodiments, set top box 130 may request the regularly scheduled program associated with a recorded event that was interrupted by an emergency alert break-in after the regularly scheduled program has terminated/aired. In these embodiments, set-top box 130 may modify the recording setting to store the received regularly scheduled program for enabling the viewer to playback the regularly scheduled program at a desired time. For example, in some embodiments, set top box 130 may record the streaming data of the regularly scheduled program and store the recorded data. In other embodiments, set top box 130 may download the regularly scheduled program and associate the downloaded file with the corresponding recording setting.

Figure 2:
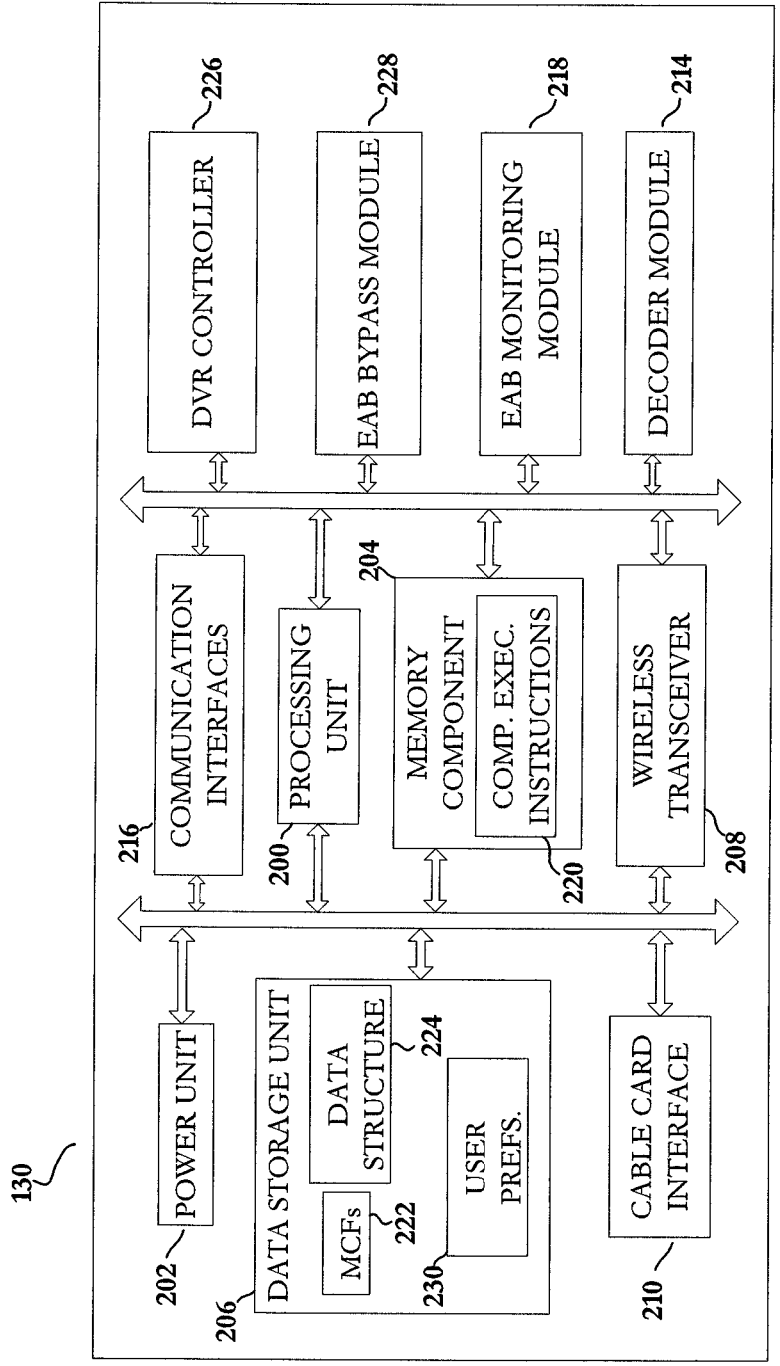
FIG. 2 depicts an embodiment of a set top box in accordance with the illustrative embodiments.

FIG. 2 depicts an embodiment of set top box 130 for bypassing an emergency alert break-in for a recorded event. In the depicted embodiment, set top box 130 comprises, among other components, a processing unit 200, a power unit 202, a memory component 204, a data storage unit 206, a wireless transceiver 208, a cable card interface 210, a decoder module 214, and a set of communication interfaces 216.

Processing unit 200 may comprise of one or more microprocessors for executing computer usable program code/instructions for providing television programming and for bypassing an emergency alert break-in for a recorded event. For example, in one embodiment, processing unit 200 executes computer executable instructions 220 stored in memory component 204 for identifying an emergency alert break-in signal and modifying a recording setting to record a non-emergency alert break-in channel.

In some embodiments, memory component 204 is a volatile memory component of set top box 130. Volatile memory is memory that loses its contents when set top box 130 loses power. For example, in some embodiments, memory component 204 may be random access memory (RAM). Random access memory stores currently executing instructions and/or data utilized by an operating system, software program, hardware device, and/or a user.

Data storage unit 206 is a non-volatile memory component of set top box 130, such as, but not limited to, a hard disk drive. Non-volatile memory retains stored data when power is loss. In some embodiments, data storage unit 206 may be an external hard drive and/or a network data storage unit. In some embodiments, data storage unit 206 may store media content files 222, such as, but not limited to, television content received from cable head end 104. In addition, in accordance with one embodiment, data storage unit 206 may store a data structure 224, such as, but not limited to, a data table that includes a list of non-emergency alert break-in channels corresponding to a plurality of regularly scheduled broadcasting channels. Additionally, in some embodiments, data storage unit 206 may store a set of user preferences 230 associated with the recording of one or more television programs. For example, in some embodiments, a user may modify user preferences 230 to specify whether a recording event should bypass an emergency alert break-in. In some embodiments, a user may specify for each individual recording event whether to bypass an emergency alert break-in. In other embodiments, a user may specify to bypass an emergency alert break-in for all recording events.

In accordance with the disclosed embodiments, set top box 130 includes communication interfaces 216 for receiving media content signals/data from, but not limited to, cable head end 104. In addition, in some embodiments, communication interfaces 216 may provide connection ports for coupling set top box 130 to one or more electronic devices. For example, in one embodiment, communication interfaces 216 includes a video output interface, such as, but not limited to, a coaxial cable connection for coupling set top box 130 to display unit 150 (as depicted in FIG. 1). In some embodiments, communication interfaces 216 may include an Ethernet port and/or a telephone line port for connecting set top box 130 to a network device over a telephone network and/or Internet 120. Additionally, in some embodiments, set top box 130 may include other connector ports, such as, but not limited to, a 1394 port, a universal serial bus (USB) port, and/or a high-definition multimedia interface (HDMI).

Set top box 130 may also include one or more decoder module 214 for decoding received media content signals, such as, but not limited to, cable television signals received from cable head end 104. For example, in some embodiments, decoder module 214 may be a quadrature amplitude modulation (QAM) tuner. Quadrature amplitude modulation is one format by which digital media content channels are encoded and transmitted by a cable company, such as, cable head end 104. A QAM tuner is an electronic tuning device used in digital television sets, set top boxes, DVRs, and other electronic equipment to tune/decode the received media content channels. In some embodiments, decoder module 214 may also be an Advanced Television Systems Committee (ATSC) tuner/receiver for receiving and decoding over the air digital channels.

In accordance with one embodiment, set top box 130 may include an emergency alert break-in (EAB) monitoring module 218 for identifying/detecting an emergency alert break-in signal. For example, all emergency alert system messages are required to be digitally encoded with a header, an attention signal, an audio announcement, and a digitally encoded end-of-message marker The header includes information about who originated the alert (the President, state or local authorities, the National Weather Service, or the broadcaster), a short, general description of the event (tornado, flood, severe thunderstorm), the counties or states affected, the expected duration of the event (in minutes), the date and time it was issued, and an identification of the originating station. The attention signal follows the header and may last between 8 to 25 seconds, depending on the originating station. For example, in some embodiments, commercial broadcasting stations, such as local broadcasting stations 122, may broadcast an attention signal consisting of a "two tone" combination of 853 Hz and 960 Hz sine waves. The emergency alert system message ends with three bursts of an end of message indicator, which is the text NNNN, preceded each time by the binary 10101011.

In one embodiment, emergency alert break-in monitoring module 218 may identify an emergency alert break-in signal transmitted from cable head end 104 by recognizing the header information and/or the attention signal associated with an emergency alert system message encoded in one or more broadcast channels. In some embodiments, emergency alert system monitoring module 218 may be a dedicated tuner for monitoring a particular channel associated with a recording event for identifying an emergency alert break-in.

In addition, in some embodiments, set top box 130 may include an emergency alert break-in bypass module 228 for bypassing an emergency alert break-in for a recorded event. As will be further described, in some embodiments, bypass module 228 may retrieve user preferences 230 associated with a recording event to determine whether to bypass recording of an emergency alert break-in on the channel associated with the recording event. In some embodiments, bypass module 228 may identify a non-emergency alert break-in channel associated with the recording event and modify a recording setting to record the non-emergency alert break-in channel for the recording event. In other embodiments, bypass recording module 228 may request a regularly scheduled program corresponding to the recording event from a cable service provider and/or an Internet television source and modify the recording setting to record the received regularly scheduled program.

Additionally, set top box 130 may include a digital video recorder (DVR) controller 226 for recording and playback of media content files 222. In some embodiments, DVR controller 226 may be utilized to record and/or playback streaming video received from an Internet source. In some embodiments, DVR controller 226 may encompass one or more functions and/or features performed by bypass module 228 and/or emergency alert break-in monitoring module 218 as described above.

In one embodiment, set top box 130 may include wireless transceiver 208 for providing short-range exchange of data using, but not limited to, infrared light. For example, in one embodiment, wireless transceiver 208 enables a viewer to utilize a remote control device to configure and operate set top box 130, such as, but not limited to, configuring set top box 130 to record an event/program. Additionally, in some embodiments, wireless transceiver 208 may utilize a wireless Internet protocol for communicating data wirelessly to cable modem 114. For example, in one embodiment, wireless transceiver 208 may receive streaming media content from an Internet source via a cable modem 114.

In some embodiments, set top box 130 may include a cable card interface 210 for interfacing with a plug-in cable/smart card that enables viewing and/or recording of cable television programming. For example, in some embodiments, cable card 210 comprises instructions and/or a decryption key for decoding encrypted cable television signals transmitted by cable head end 104.

Additionally, set top box 130 may include a power source, such as, power unit 202. In one embodiment, power unit 202 converts the input power from an AC adaptor to run various components of set top box 130. In addition, in some embodiments, power unit 202 may include an internal power source, such as, but not limited to, a battery component.

Figure 3:
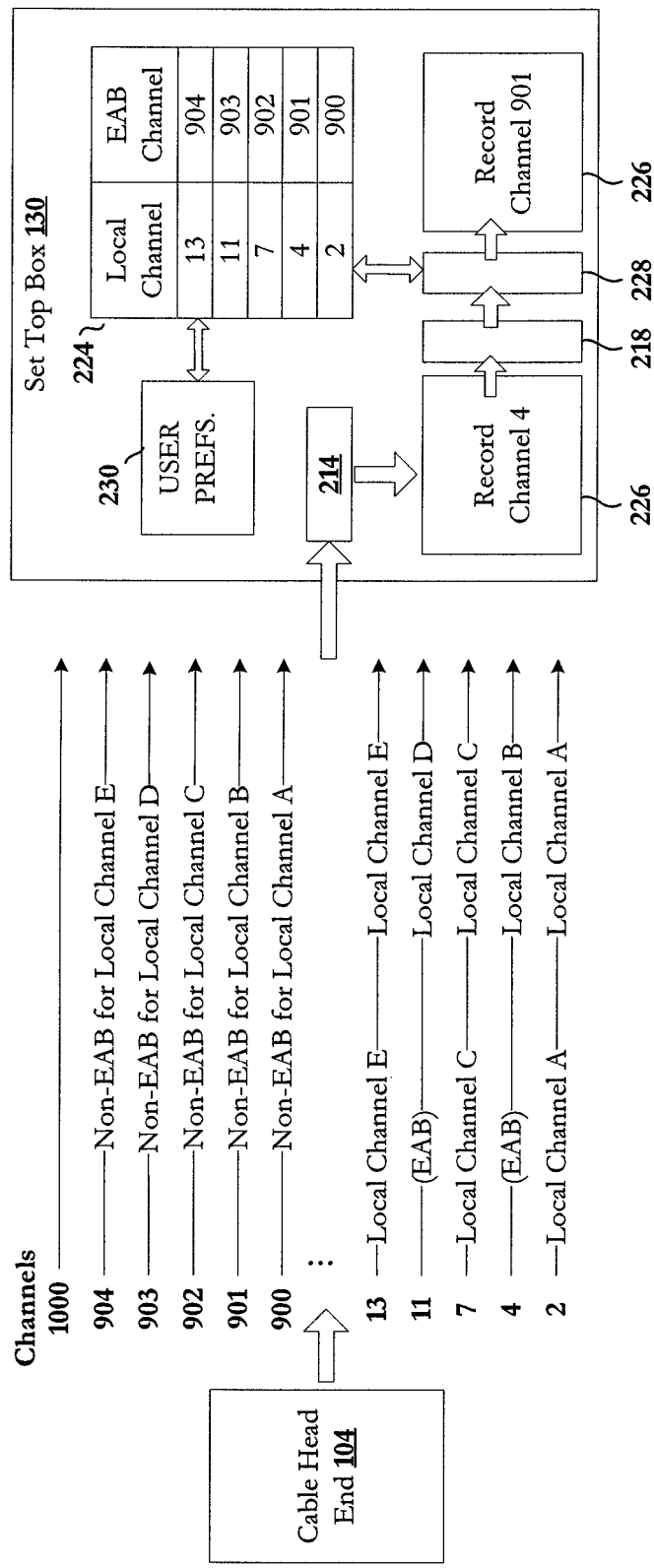
FIG. 3 depicts a block diagram illustrating one embodiment for bypassing an emergency alert break-in for a recorded event.

With reference now to FIG. 3, a diagram illustrating one embodiment for bypassing an emergency alert break-in for a recorded event is presented. In the depicted embodiment, cable head end 104 transmits a plurality of channels, such as, but not limited to, channels 1-1000 to a plurality of subscribers including, but not limited to, set-top box 130. For example, in one embodiment, channels 1-1000 may include five local channels associated with the location of set top box 130. For instance, in the depicted embodiment, local channels A-E are respectively encoded on channel frequencies 2, 4, 7, 11, and 13. In accordance with one embodiment, cable head end 104 may encode an emergency alert break-in (EAB) on one or more local channels, such as, but not limited to, local channel 2 and local channel 11. In one embodiment, cable head end 104 may also transmit a set of non-emergency alert break-in channels 900-904 respectively associated with local channels A-E. In these embodiments, set top box 130 may utilize data structure 224 for determining the corresponding non-emergency alert break-in channel for a local channel.

For example, in the depicted embodiment, set top box 130 utilizing decoder module 214 decodes one or more of the received channels to produce video/audio content. In one embodiment, decoder module 214 communicates with DVR controller 226 to determine a recording setting. For example, in the depicted embodiment, DVR controller 226 is set to record channel 4 (local channel B). In the depicted embodiment, decoder module 214 decodes local channel B and passes the signal to emergency alert break-in monitoring module 218 for determining whether local channel B is encoded with an emergency alert break-in. In some embodiments, emergency alert break-in monitoring module 218 may include a separate tuner/decoder for decoding the recorded channel. In one embodiment, emergency alert break-in monitoring module 218 identifies an emergency alert break-in by monitoring for the header information and/or an attention signal associated with an emergency alert system message. In the depicted embodiment, in response to detecting an emergency alert break-in on the recorded channel, emergency alert break-in monitoring module 218 passes the information to emergency alert break-in bypass module 228. In one embodiment, emergency alert break-in bypass module 228 retrieves data structure 224 for identifying a corresponding non-emergency alert break-in channel associated with local channel B. In some embodiments, emergency alert break-in bypass module 228 may also retrieve user preferences 230 to determine whether to bypass an emergency alert break-in for the recorded event. In one embodiment, in response to a determination to bypass the emergency alert break-in for the recorded event, emergency alert break-in bypass module 228 modifies the recording setting of DVR controller 226 to record non-emergency alert break-in channel 901 corresponding to local channel B.

With reference now to FIG. 4, an embodiment of flowchart depicting a process 400 for bypassing an emergency alert break-in for recorded event is presented. Process 400 may be executed by a set top box, such as, but not limited to, set top box 130 as depicted in FIG. 2. Process 400 begins by receiving media content data from, but not limited to, cable head end 140 at step 402. At step 404, the process retrieves the settings associated with a digital video recorder of the set top box. The process, at step 406, determines whether the digital video recorder is set to record a recording event. If the process determines that the digital video recorder is not set to record a recording event, the process terminates.

However, if the process determines that the digital video recorder is set to record a recording event, the process determines the recording channel associated with the recording event at step 408. At step 410, the process decodes the television signal associated with the recording channel of the recording event. The process, at step 412, determines whether the decoded television signal associated with the recording channel includes an emergency alert break-in. If the process determines that the television signal associated with the recording channel does not include an emergency alert break-in, the process records the recording channel at step 414, with process 400 terminating thereafter.

If the process, at step 412, determines that the television signal associated with the recording channel does include an emergency alert break-in, the process retrieves the user preferences associated with the recording event. At step 418, the process determines whether to bypass recording of the emergency alert break-in for the recording event based on the retrieved user preferences. If for some reason, a user elects not to bypass recording of an emergency alert break-in for the recording event, the process records the recording channel at step 414, with process 400 terminating thereafter.

However, if the process, at step 418, determines to bypass an emergency alert break-in for a recording event based on the retrieved user preferences, the process bypasses the emergency alert break-in and records the regularly scheduled program associated with the recording channel. For example, in one embodiment, the process, at step 420, may determine a non-emergency alert break-in channel associated with the recording channel. At step 422, the process modifies the recording setting to record from the non-emergency alert break-in channel, with process 400 terminating thereafter.

In accordance with another embodiment, responsive to a determination to bypass an emergency alert break-in for a recording event, the process, at step 424, may transmit a request to a cable service provider for the regularly scheduled program associated with the recording event. In response to receiving the regularly scheduled program from the cable service provider, the process, at step 426, modifies the recording setting to record the received regularly scheduled program in lieu of recording the recording channel, with process 400 terminating thereafter.

In addition, in accordance with some embodiments, responsive to a determination to bypass an emergency alert break-in for a recording event, the process, at step 428, may request the regularly scheduled program from an Internet source. For example, currently, several websites enables live viewing of local broadcast channels via the Internet. In addition, several broadcasting networks maintain websites that enable viewing of aired episodes associated with their regularly scheduled programs. In one embodiment, a user may configure set top box 130 to retrieve the regularly scheduled program from a particular website. In addition, in some embodiments, set top box 130 may be configured to automatically query an Internet source for the desired regularly scheduled program. In other embodiments, a user may manually query and retrieve the regularly scheduled program from the Internet source using set-top box 130.

In response to receiving the regularly scheduled program from the Internet source, the process modifies the recording setting to store the retrieved regularly scheduled program at step 430, with process 400 terminating thereafter. In some embodiments, the process may record the streaming video retrieved from an Internet source. In other embodiments, the process may download a media content file associated with a regularly scheduled programming and associated the downloaded media content file with the recorded event.

Accordingly, embodiments of the disclosed invention include a system and a method for bypassing an emergency alert break-in for a recorded event. As will be appreciated by one skilled in the art, the disclosed embodiments may be embodied as a system, method, or computer program product. In addition, the disclosed embodiments including, but not limited to, the disclosed modules may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special, purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A set top box for bypassing an emergency alert break-in for a recorded event, the set top box comprising:
   a memory component for storing computer executable instructions;
   a communication interface for receiving media content data from a cable service provider;
   a decoder module for decoding the received media content data;
   an emergency alert break-in monitoring module for identifying an emergency alert break-in from the received data, by determining whether the received data includes a tone-based attention signal associated with an emergency alert break-in;
   a digital video recorder controller module for determining whether the identified emergency alert break-in affects a recording of a program on a recorded channel; and
   an emergency alert break-in bypass module for bypassing the identified emergency alert break-in for enabling the digital video recorder controller module to record the program without the identified emergency alert break-in by requesting, in response to a determination to bypass the emergency alert break-in, the program from an Internet television source, and, responsive to receiving the program from the internet television source, recording the received program.

2. The set top box of claim 1, wherein the communication interface receives both the recorded channel and a non-emergency alert break-in channel corresponding to the recorded channel.

3. The set top box of claim 2, further comprising a data storage unit for storing a data structure that includes data indicating the non-emergency alert break-in channel corresponding to the recorded channel.

4. The set top box of claim 3, wherein the emergency alert break-in bypass module identifies the non-emergency alert break-in channel corresponding to the recorded channel; and switches recording of the program from the recorded channel to recording of the program on the non-emergency alert break-in channel corresponding to the recorded channel.

5. The set top box of claim 2, wherein the data storage unit stores user preferences associated with the recording of the program.

6. The set top box of claim 5, wherein the user preferences associated with the recording of the program may be different from user preferences associated with the recording of a second program.

7. The set top box of claim 5, wherein the emergency alert break-in bypass module retrieves the user preferences associated with the recording of the program to determine whether to bypass the identified emergency alert break-in for recording of the program.

8. The set top box of claim 1, wherein the emergency alert break-in bypass module requests the program from the cable service provider in response to a determination that the identified emergency alert break-in affects the recording of the program on the recorded channel; and responsive to receiving the program from the cable service provider, the digital video recorder controller module records the received program.

9. The set top box of claim 1, wherein the internet television source is a website associated with a network broadcasting the program.

10. A method executed by a set top box for bypassing an emergency alert break-in for a recorded event, the method comprising:
    receiving media content data from a cable service provider;
    determining a recording setting associated with the set top box;
    determining whether the media content data includes an emergency alert break-in on a channel associated with the recording setting, by determining whether the media content data includes a tone-based attention signal associated with an emergency alert break-in; and
    bypassing recording of the emergency alert break-in on the channel associated with the recording setting by:
        requesting, in response to a determination to bypass an emergency alert break-in for a recording event, a regularly scheduled program corresponding to the channel associated with the recording setting from an Internet television source; and
        modifying, responsive to receiving the regularly scheduled program from the Internet television source, the recording setting to record the received regularly scheduled program.

11. The method of claim 10, wherein the step of bypassing recording of the emergency alert break-in on the channel associated with the recording setting further comprises:
    retrieving user preferences associated with the recording setting; and
    determining whether to bypass recording of the emergency alert break-in on the channel associated with the recording setting based on the user preferences.

12. The method of claim 10, wherein the media content data received from the cable service provider includes a non-emergency alert break-in channel corresponding to the channel associated with the recording setting.

13. The method of claim 12, wherein the non-emergency alert break-in channel may only be decoded for recording of the nonemergency alert break-in channel.

14. The method of claim 12, wherein the step of bypassing recording of the emergency alert break-in on the channel associated with the recording setting further comprises:
    identifying the non-emergency alert break-in channel corresponding to the channel associated with the recording setting; and
    modifying the recording setting to record the non-emergency alert break-in channel.

15. The method of claim 10, wherein the step of bypassing recording of the emergency alert break-in on the channel associated with the recording setting further comprises:
    requesting a regularly scheduled program corresponding to the channel associated with the recording setting from the cable service provider; and responsive to receiving the regularly scheduled program from the cable service provider, modifying the recording setting to record the received regularly scheduled program.

16. The method of claim 10, wherein the Internet television source is a website associated with a network broadcasting the regularly scheduled program.

17. The method of claim 10, wherein the request for the regularly scheduled program is transmitted to the Internet television source is performed after the regularly scheduled program has terminated.

* * * * *